US012783348B2

(12) United States Patent
Adham et al.

(10) Patent No.: US 12,783,348 B2
(45) **Date of Patent: *Nov. 3, 2026**

(54) MEMORY ADDRESS PROTECTION CIRCUIT AND METHOD OF OPERATING SAME

(71) Applicant: TAIWAN SEMICONDUCTOR MANUFACTURING COMPANY, LTD., Hsinchu (TW)

(72) Inventors: Saman M. I. Adham, Hsinchu (TW); Ramin Shariat-Yazdi, Hsinchu (TW); Shih-Lien Linus Lu, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 39 days.

This patent is subject to a terminal disclaimer.

(21) Appl. No.: 18/936,254

(22) Filed: Nov. 4, 2024

(65) Prior Publication Data

US 2025/0061018 A1 Feb. 20, 2025

Related U.S. Application Data

(63) Continuation of application No. 18/355,222, filed on Jul. 19, 2023, now Pat. No. 12,135,608, which is a (Continued)

(51) Int. Cl.

*G06F 11/10* (2006.01)
*G06F 11/00* (2006.01)

(Continued)

(52) U.S. Cl.

CPC .......... *G06F 11/1016* (2013.01); *G06F 12/14* (2013.01); *G06F 2212/1052* (2013.01)

(58) Field of Classification Search

CPC ................ G06F 11/1016; G06F 12/14; G06F 2212/1052; G11C 29/18; G11C 8/10; G11C 29/04; G11C 29/42; G11C 2029/0411

See application file for complete search history.

(56) References Cited

U.S. PATENT DOCUMENTS 3,599,146 A 8/1971 Weisbecker
4,802,172 A 1/1989 Fukami (Continued)

FOREIGN PATENT DOCUMENTS

KR 10-0720911 5/2007
KR 10-2008-0050433 6/2008

(Continued)

OTHER PUBLICATIONS

Office Action dated May 4, 2018 from corresponding application No. KR 10-2017-0101503.

(Continued)

*Primary Examiner* — Justin R Knapp
(74) *Attorney, Agent, or Firm* — Hauptman Ham, LLP

(57) ABSTRACT

A memory circuit includes: a memory configured to store a data unit and a corresponding first code; a decoding circuit configured to do as follows including, generate a second code based on a read address associated with the stored data unit, and generate a decoded write address based on the second code; a first error detecting circuit configured to do as follows including, determine an address fault by performing a first comparison between the read address and the decoded write address, and generate an error signal indicative of a result of the first comparison.

20 Claims, 5 Drawing Sheets

Related U.S. Application Data continuation of application No. 17/855,412, filed on Jun. 30, 2022, now Pat. No. 11,714,705, which is a continuation of application No. 16/989,018, filed on Aug. 10, 2020, now Pat. No. 11,379,298, which is a continuation of application No. 15/622,408, filed on Jun. 14, 2017, now Pat. No. 10,740,174.

(60) Provisional application No. 62/427,684, filed on Nov. 29, 2016.

(51) Int. Cl.
*G06F 12/00* (2006.01)
*G06F 12/14* (2006.01)

(56) References Cited

U.S. PATENT DOCUMENTS

| | | | | |
|---|---|---|---|---|
| 5,173,905 | A | 12/1992 | Parkinson et al. | |
| 5,717,653 | A | 2/1998 | Suzuki | |
| 5,815,283 | A | 9/1998 | Watanabe | |
| 6,072,746 | A | 6/2000 | Durham et al. | |
| 7,203,890 | B1 | 4/2007 | Normoyle | |
| 7,555,699 | B2 | 6/2009 | Kuramoto et al. | |
| 7,779,334 | B2 | 8/2010 | Earle et al. | |
| 8,099,651 | B2 * | 1/2012 | Normoyle | G06F 11/1016 714/767 |
| 8,255,674 | B2 | 8/2012 | Hickey et al. | |
| 8,301,959 | B2 | 10/2012 | Chung | |
| 8,464,136 | B2 | 6/2013 | Tsai et al. | |
| 8,605,523 | B2 | 12/2013 | Tao et al. | |
| 8,630,132 | B2 | 1/2014 | Cheng et al. | |
| 8,671,329 | B2 * | 3/2014 | Kumar | G06F 11/1008 710/39 |
| 8,760,948 | B2 | 6/2014 | Tao et al. | |
| 8,908,421 | B2 | 12/2014 | Liaw | |
| 8,929,160 | B2 | 1/2015 | Katoch et al. | |
| 8,964,492 | B2 | 2/2015 | Hsu et al. | |
| 8,982,643 | B2 | 3/2015 | Lum | |
| 9,117,510 | B2 | 8/2015 | Yang et al. | |
| 9,208,858 | B1 | 12/2015 | Lin et al. | |
| 9,218,872 | B1 | 12/2015 | Liaw | |
| 9,405,624 | B2 | 8/2016 | Alhussien et al. | |
| 9,589,676 | B2 * | 3/2017 | Choi | G11C 11/419 |
| 2008/0005519 | A1 | 1/2008 | Pawlowski | |
| 2010/0049909 | A1 | 2/2010 | Lasser | |
| 2014/0153345 | A1 | 6/2014 | Kim et al. | |
| 2014/0233330 | A1 | 8/2014 | Ko et al. | |
| 2015/0348598 | A1 | 12/2015 | Wang et al. | |
| 2015/0371702 | A1 | 12/2015 | Wu et al. | |
| 2015/0380077 | A1 | 12/2015 | Wu et al. | |
| 2015/0380078 | A1 | 12/2015 | Liaw | |
| 2017/0192842 | A1 | 7/2017 | van Ruymbeke | |

FOREIGN PATENT DOCUMENTS

| | | |
|---|---|---|
| TW | 201612908 | 4/2016 |
| TW | 201618118 | 5/2016 |

OTHER PUBLICATIONS

Office Action dated Dec. 27, 2017 from corresponding application No. TW 106129062.

* cited by examiner

MEMORY ADDRESS PROTECTION CIRCUIT AND METHOD OF OPERATING SAME

PRIORITY CLAIM

The present application is a continuation of U.S. application Ser. No. 18/355,222, filed Jul. 19, 2023, now U.S. Pat. No. 12,135,608, issued Nov. 5, 2024, which is a continuation of U.S. application Ser. No. 17/855,412, filed Jun. 30, 2022, now U.S. Pat. No. 11,714,705, issued Aug. 1, 2023, which is a continuation of U.S. application Ser. No. 16/989,018, filed Aug. 10, 2020, now U.S. Pat. No. 11,379,298, issued Jul. 5, 2022, which is a continuation of U.S. application Ser. No. 15/622,408, filed Jun. 14, 2017, now U.S. Pat. No. 10,740,174, issued Aug. 11, 2020, which claims the priority of U.S. Provisional Application No. 62/427,684, filed Nov. 29, 2016, which are incorporated herein by reference in their entireties.

BACKGROUND

Applications involving memory circuits frequently employ approaches to protect memory data and addresses against faults that can cause functional errors. The approaches include on-line and off-line fault detection and error correction.

With on-line approaches based on error correcting code (ECC), permanent, transient, intermittent, and latent faults are potentially identified and corrected during functional operation. With off-line approaches based on dedicated hardware and/or software, errors are addressed during power-on sequences or other situations in which a circuit is not engaged in functional activities.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
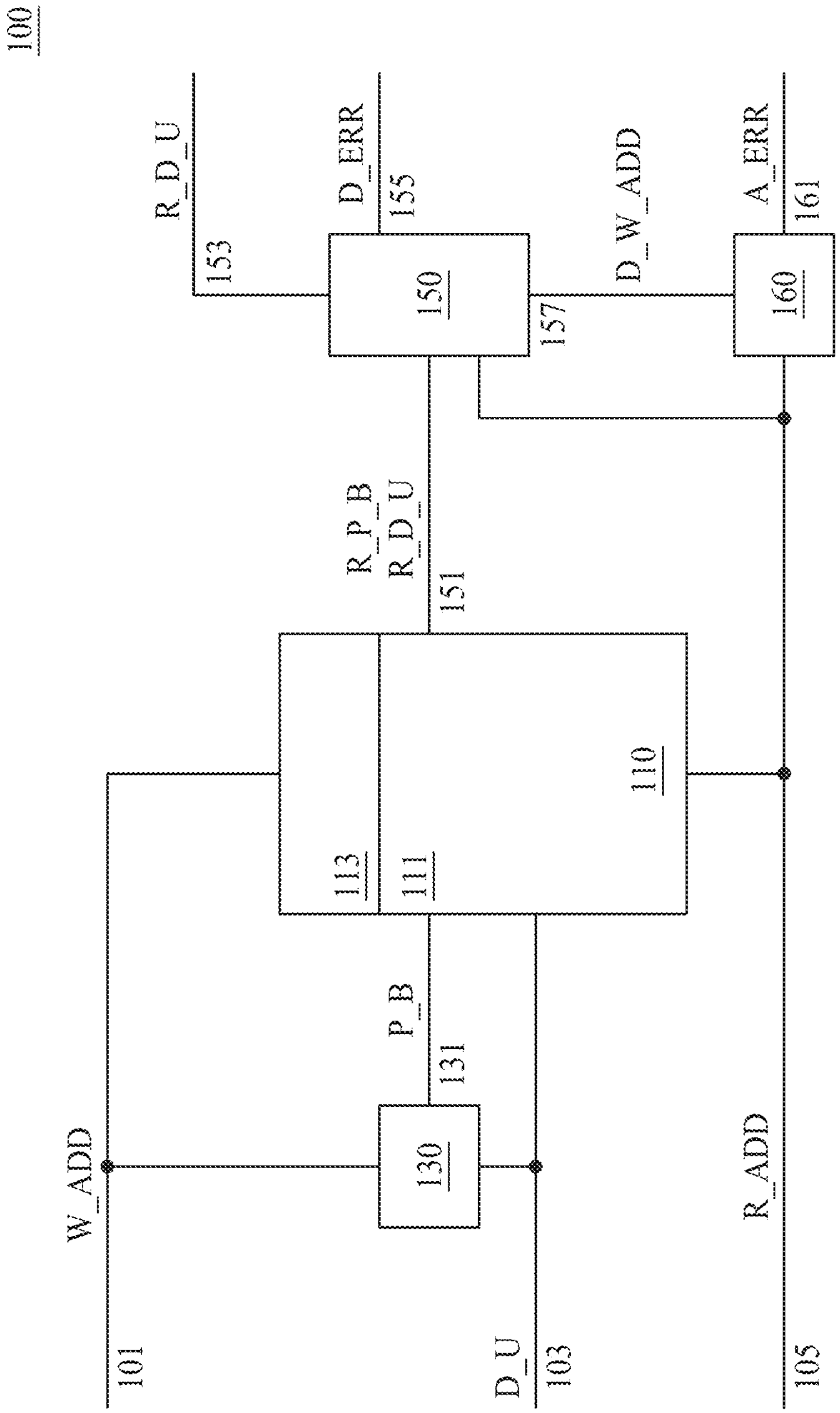
FIG. 1 is a diagram of a memory circuit, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A memory circuit includes a memory, an address port, a decoding circuit, and an error detecting circuit. The memory stores bits of data in the form of a data unit and parity bits, the address port receives a read address associated with the stored data unit, the decoding circuit generates a decoded write address from the read address and the parity bits, and the error detecting circuit compares the read address with the decoded write address to determine if an address error exists. In some embodiments, the parity bits are generated from the write address and data unit, and in other embodiments, the parity bits are generated from the write address only. In some embodiments, the address port is a read address port and the memory circuit includes a write address port separate from the read address port, and in other embodiments, the address port also receives a write address in a write operation. In some embodiments, the memory is a read-only memory (ROM), and the parity bits are generated as part of a ROM programming process.

FIG. 1 is a diagram of a memory circuit 100, in accordance with some embodiments. Memory circuit 100 includes a memory 110, an encoding circuit 130, a decoding circuit 150, and an error detecting circuit 160. A write address port 101 is configured to receive a write address W_ADD, a data input port 103 is configured to receive a data unit D_U to be stored in memory 110 at the location specified by write address W_ADD, and a read address port 105 is configured to receive a read address R_ADD that identifies the location at which data unit D_U is stored.

Memory 110 is configured to receive write address W_ADD on write address port 101, data unit D_U on data input port 103, and read address R_ADD on read address port 105. Memory 110 is also configured to receive one or more parity bits P_B from encoding circuit 130 on a parity bit port 131.

Memory 110 is configured to store data, including data unit D_U, in a memory portion 111, and to store parity data, including parity bits P_B, in a memory portion 113. Memory 110 is configured to store data unit D_U and parity bits P_B at one or more locations determined based on write address W_ADD on write address port 101, and to retrieve stored data unit D_U and parity bits P_B from the one or more locations in response to read address R_ADD on read address port 105.

In some embodiments, memory 110 is configured to store data unit D_U and parity bits P_B as a single word, with data unit D_U stored at a location in memory portion 111 adjacent to a location at which parity bits P_B are stored in memory portion 113. In some embodiments, data unit D_U is stored in memory portion 111 at a location that is separate from a location at which parity bits P_B are stored in memory portion 113.

In some embodiments, memory 110 is a multi-port memory. In some embodiments, memory 110 is a dual-port memory. In some embodiments, memory 110 is a random-access memory (RAM). In some embodiments, memory 110 is a static random-access memory (SRAM). In some embodiments, memory 110 is a dynamic random-access memory (DRAM).

In one or more embodiments, memory 110 includes circuits (not shown) such as one or more control circuits, one or more address decoding circuits, one or more input/output circuits, and/or one or more additional circuits configured to perform other functions associated with operation of memory 110.

Encoding circuit 130 is a logic circuit configured to receive write address W_ADD on write address port 101 and to receive data unit D_U on data input port 103. Encoding circuit 130 is configured to apply ECC to write address W_ADD and data unit D_U to generate parity bits P_B. ECC is logic that produces parity or other bits usable to identify and/or correct errors in the bits to which it is applied. Encoding circuit 130 is configured to output parity bits P_B on parity bit port 131.

In some embodiments, encoding circuit 130 comprises hardware configured to execute ECC. In some embodiments, encoding circuit 130 comprises a combination of hardware and software configured to execute ECC.

In some embodiments, write address W_ADD includes 10 bits of data. In other embodiments, W_ADD includes more than or fewer than 10 bits of data. In some embodiments, data unit D_U includes 32 bits of data. In other embodiments, data unit D_U includes more than or fewer than 32 bits of data. In some embodiments, parity bits P_B include 7 bits of data. In other embodiments, parity bits P_B include more than or fewer than 7 bits of data.

Memory 110 is configured to output a retrieved data unit R_D_U and retrieved parity bits R_P_B on a memory output port 151. Decoding circuit 150 is configured to receive retrieved stored data unit R_D_U and retrieved parity bits R_P_B on memory output port 151 and to receive read address R_ADD on read address port 105.

Decoding circuit 150 is configured to apply ECC to retrieved data unit R_D_U, retrieved parity bits R_P_B, and read address R_ADD. In some embodiments, decoding circuit 150 comprises hardware configured to execute ECC. In some embodiments, decoding circuit 150 comprises a combination of hardware and software configured to execute ECC.

Based on ECC applied to retrieved data unit R_D_U and retrieved parity bits R_P_B, decoding circuit 150 is configured to output retrieved data unit R_D_U on a data output port 153 and to output an error signal D_ERR on a data error port 155. In some embodiments, decoding circuit 150 is configured to correct one or more errors in retrieved data unit R_D_U before outputting retrieved data unit R_D_U on data output port 153. Decoding circuit 150 is configured to output error signal D_ERR on data error port 155 indicative of ECC detecting an error in retrieved data unit R_D_U. In some embodiments, decoding circuit 150 is not configured to output error signal D_ERR on data error port 155.

Based on ECC applied to retrieved parity bits R_P_B and received read address R_ADD, decoding circuit 150 is configured to generate and output a decoded write address D_W_ADD on a decode output port 157. Encoding circuit 130 and decoding circuit 150 are configured so that, in the absence of a detectible error in the original write address W_ADD on write address port 101 or read address R_ADD on read address port 105, decoded write address D_W_ADD on decode output port 157 is a replica of the original write address W_ADD received on write address port 101. Encoding circuit 130 and decoding circuit 150 are configured so that, if an error is detected in either write address W_ADD on write address port 101 or read address R_ADD on read address port 105, decoded write address D_W_ADD on decode output port 157 is not a replica of write address W_ADD on write address port 101. Additional details regarding decoding are disclosed in commonly assigned U.S. Pat. No. 7,779,334, granted Aug. 17, 2010, commonly assigned U.S. Pat. No. 8,301,959, granted Oct. 30, 2012, commonly assigned U.S. Pat. No. 8,464,136, granted Jun. 11, 2013, and U.S. Pat. No. 5,173,905, granted Dec. 22, 1992, the entireties of each of which are hereby incorporated by reference.

In a non-limiting example, in operation, decoding circuit 150 applies ECC to read address R_ADD on read address port 105 to produce regenerated parity bits. If no error exists in either write address W_ADD on write address port 101 or read address R_ADD on read address port 105, the regenerated parity bits are identical to retrieved parity bits R_P_B on memory output port 151, and read address R_ADD is output as decoded write address D_W_ADD on decode output port 157. If an error exists in either write address W_ADD on write address port 101 or read address R_ADD on read address port 105, the regenerated parity bits are not identical to retrieved parity bits R_P_B on memory output port 151. In this case, ECC is applied to read address R_ADD on read address port 105 by decoding circuit 150 such that decoding circuit 150 generates and outputs decoded write address D_W_ADD on decode output port 157 as a corrected version of read address R_ADD, the correction being designed so that decoded write address D_W_ADD produces parity bits identical to retrieved parity bits R_P_B.

Error detecting circuit 160 is configured to receive decoded write address D_W_ADD on decode output port 157 and to receive read address R_ADD on read address port 105. Error detecting circuit 160 is configured to compare decoded write address D_W_ADD on decode output port 157 with read address R_ADD on read address port 105, determine if an address error exists, and generate an error signal A_ERR indicative of a result of the comparison. Error detecting circuit 160 is configured to output error signal A_ERR on an address error port 161. In some embodiments, error detecting circuit 160 is configured to output error signal A_ERR on address error port 161 indicating an error if decoded write address D_W_ADD on decode output port 157 is not equal to read address R_ADD on read address port 105.

Error detecting circuit 160 includes hardware configured to perform a comparison of decoded write address D_W_ADD on decode output port 157 with read address R_ADD on read address port 105 and to generate error signal A_ERR. In some embodiments, error detecting circuit includes one or more logic gates.

Memory circuit 100 is thereby configured so that, in operation, the existence of an address error is determined from decoded write address D_W_ADD on decode output port 157 and read address R_ADD on read address port 105, decoded write address D_W_ADD on decode output port 157 being based on read address R_ADD on read address port 105 and parity bits P_B generated from the original write address W_ADD on write address port 101.

In some embodiments, by relying on decoded write addresses such as decoded write address D_W_ADD on decode output port 157 and received read addresses such as read address R_ADD on read address port 105, memory circuit 100 detects address errors without storing write addresses in memory. Memory circuit 100 therefore facilitates error detection and correction with a smaller memory size than memory circuits in which write addresses are stored in memory.

Figure 2:
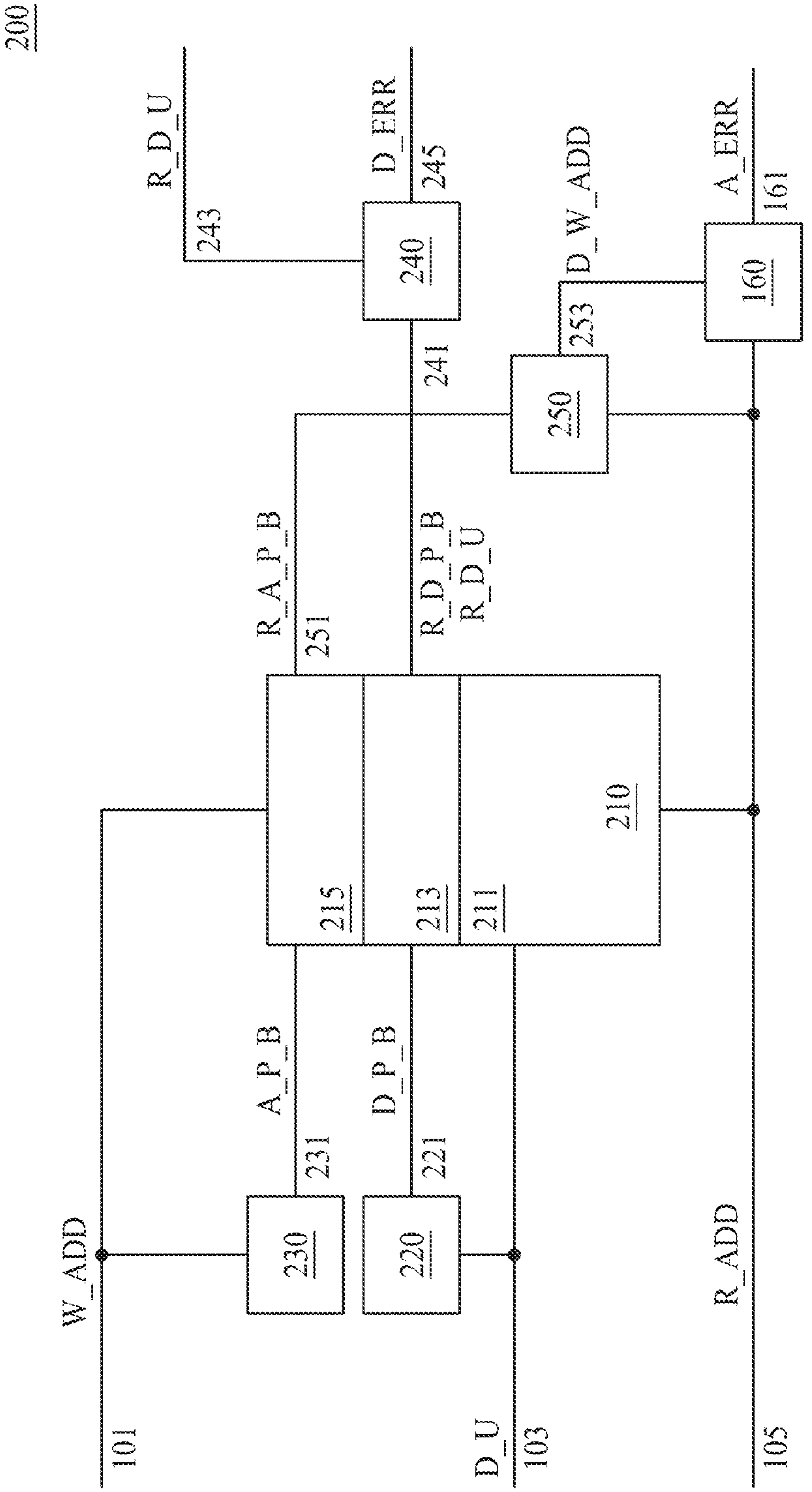
FIG. 2 is a diagram of a memory circuit, in accordance with some embodiments.

FIG. 2 is a diagram of a memory circuit 200, in accordance with some embodiments. Memory circuit 200 includes error detecting circuit 160, write address port 101, data input port 103, and read address port 105, described above with respect to memory circuit 100 and FIG. 1. Memory circuit 200 also includes a memory 210, an encoding circuit 220, an encoding circuit 230, a decoding circuit 240, and a decoding circuit 250.

Memory circuit 200 is similar to memory circuit 100, but is configured to generate, store, and retrieve parity bits for addresses separately from parity bits for data. Thus, in memory circuit 200, encoding circuit 220 and encoding circuit 230 replace encoding circuit 130, and decoding circuit 240 and decoding circuit 250 replace decoding circuit 150.

Memory 210 includes each of the features of memory 110, described above with respect to memory circuit 100, and the description below is limited to the features of memory 210 that differ from those of memory 110.

Memory 210 is configured to receive address parity bits A_P_B from encoding circuit 230 on a parity bit port 231, and to receive data parity bits D_P_B from encoding circuit 220 on a parity bit port 221. In some embodiments, parity bit port 231 and parity bit port 221 are arranged as a single parity bit port.

Memory 210 is configured to store data, including data unit D_U, in a memory portion 211, to store parity data, including data parity bits D_P_B, in a memory portion 213, and to store parity data, including address parity bits A_P_B, in a memory portion 215. Memory 210 is configured to store data unit D_U, address parity bits A_P_B, and data parity bits D_P_B at one or more locations determined by write address W_ADD on write address port 101, and to retrieve stored data unit D_U, address parity bits A_P_B, and data parity bits D_P_B from the one or more locations in response to read address R_ADD on read address port 105.

In some embodiments, memory 210 is configured to store data unit D_U, data parity bits D_P_B, and address parity bits A_P_B as a single word, with data unit D_U stored at a location in memory portion 211 adjacent to locations at which data parity bits D_P_B are stored in memory portion 213 and at which address parity bits A_P_B are stored in memory portion 215. In some embodiments, one or more of data unit D_U, data parity bits D_P_B, or address parity bits A_P_B is stored in memory 210 at one or more locations separate from one or more locations at which another one or more of data unit D_U, data parity bits D_P_B, or address parity bits A_P_B are stored.

Encoding circuit 220 is a logic circuit configured to receive data unit D_U on data input port 103 and apply ECC to data unit D_U to generate data parity bits D_P_B. Encoding circuit 220 is configured to output data parity bits D_P_B on parity bit port 221. In some embodiments, data parity bits D_P_B include 6 bits of data. In other embodiments, data parity bits D_P_B include more than or fewer than 6 bits of data.

Encoding circuit 230 is a logic circuit configured to receive write address W_ADD on write address port 101 and to apply ECC to write address W_ADD to generate address parity bits A_P_B. Encoding circuit 230 is configured to output address parity bits A_P_B on parity bit port 231. In some embodiments, address parity bits A_P_B include 2 bits of data. In other embodiments, address parity bits A_P_B include one bit of data or more than 2 bits of data.

In some embodiments, encoding circuit 220 and encoding circuit 230 are arranged as a single encoding circuit configured to receive data unit D_U on data input port 103 and write address W_ADD on write address port 101 and to generate and output data parity bits D_P_B on parity bit port 221 and address parity bits A_P_B on parity bit port 231.

Memory 210 is configured to output retrieved data unit R_D_U and retrieved data parity bits R_D_P_B on a memory output port 241. Decoding circuit 240 is configured to receive retrieved data unit R_D_U and retrieved data parity bits R_D_P_B on memory output port 241.

Based on ECC applied to retrieved data unit R_D_U and retrieved data parity bits R_D_P_B, decoding circuit 240 is configured to output retrieved data unit R_D_U on a data output port 243 and to output error signal D_ERR on a data error port 245. In some embodiments, decoding circuit 240 is configured to correct one or more errors in retrieved data unit R_D_U before outputting retrieved data unit R_D_U on data output port 243. Decoding circuit 240 is configured to output error signal D_ERR on data error port 245 indicative of ECC detecting an error in retrieved data unit R_D_U. In some embodiments, decoding circuit 240 is not configured to output error signal D_ERR on data error port 245.

Memory 210 is configured to output retrieved address parity bits R_A_P_B on a memory output port 251. Decoding circuit 250 is configured to receive retrieved address parity bits R_A_P_B on memory output port 251 and to receive read address R_ADD on read address port 105.

Decoding circuit 250 includes each of the features related to generation and output of decoded write address D_W_ADD described above with respect to decoding circuit 150, except that retrieved address parity bits R_A_P_B on memory output port 251 replace retrieved parity bits R_P_B on memory output port 151. Accordingly, based on ECC applied to retrieved address parity bits R_A_P_B and received read address R_ADD, decoding circuit 250 is configured to output decoded write address D_W_ADD on a decode output port 253.

Encoding circuit 230 and decoding circuit 250 are thereby configured so that, in the absence of a detectible error in either write address W_ADD on write address port 101 or read address R_ADD on read address port 105, decoded write address D_W_ADD on decode output port 253 is a replica of write address W_ADD on write address port 101. Encoding circuit 230 and decoding circuit 250 are thereby configured so that, if an error is detected in either write address W_ADD on write address port 101 or read address R_ADD on read address port 105, decoded write address D_W_ADD on decode output port 253 is not a replica of write address W_ADD on write address port 101.

Error detecting circuit 160 is configured to receive decoded write address D_W_ADD on decode output port 253. Otherwise, error detecting circuit 160 is configured as described above with respect to memory circuit 100.

In some embodiments, decoding circuit 240 and decoding circuit 250 are arranged as a single decoding circuit configured to receive retrieved data unit R_D_U and retrieved data parity bits R_D_P_B on memory output port 241, and retrieved address parity bits R_A_P_B on memory output port 251, and to generate and output retrieved data unit R_D_U on data output port 243, error signal D_ERR on data error port 245, and decoded write address D_W_ADD on decode output port 253. Although a single decoding circuit requires a smaller area than separate decoding circuits, separate decoding circuits are able to provide more efficient and robust debugging and diagnostic capability compared to a single decoding circuit.

Memory circuit 200 is thereby configured so that, in operation, the existence of an address error is determined from decoded write address D_W_ADD on decode output port 253 and read address R_ADD on read address port 105, decoded write address D_W_ADD on decode output port 253 being based on read address R_ADD on read address port 105 and parity bits P_B generated exclusively from the original write address W_ADD on write address port 101.

By relying on decoded write addresses such as D_W_ADD on decode output port 253 and received read addresses such as R_ADD on read address port 105, memory circuit 200 detects address errors without storing write addresses in memory. Memory circuit 200 therefore facilitates error detection and correction with a smaller memory size than memory circuits in which write addresses are stored in memory. Compared to memory circuit 100, in some embodiments, memory circuit 200 consumes a slightly larger memory area/footprint to store data parity bits and address parity bits separately, and requires a slightly larger area/footprint for separate decoding circuits, but facilitates better fault diagnosis and avoids address fault aliasing.

Figure 3:
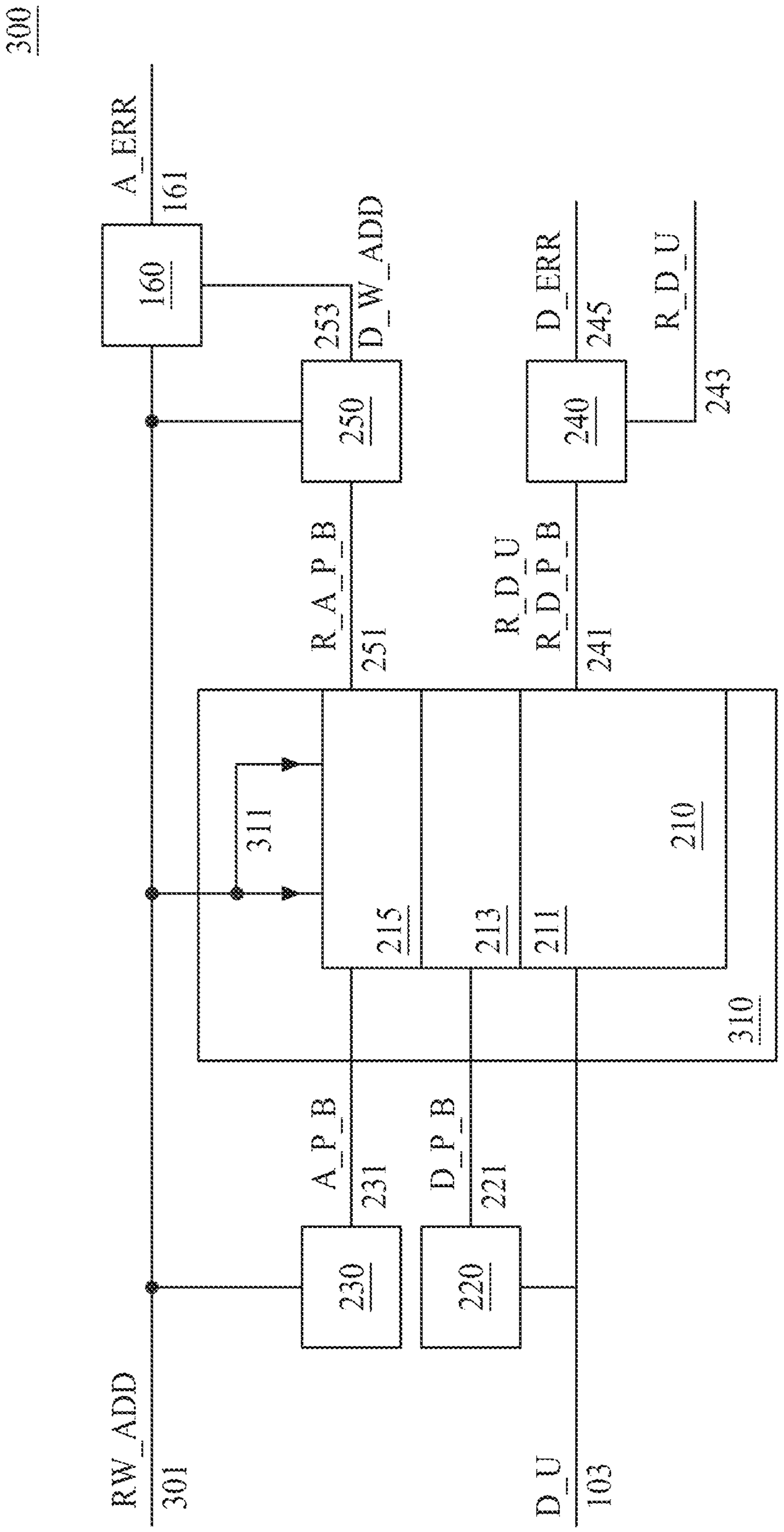
FIG. 3 is a diagram of a memory circuit, in accordance with some embodiments.

FIG. 3 is a diagram of a memory circuit 300, in accordance with some embodiments. Memory circuit 300 includes error detecting circuit 160, memory 210, encoding circuit 220, encoding circuit 230, decoding circuit 240, decoding circuit 250, and data input port 103 described above with respect to memory circuits 100 and 200 and FIGS. 1 and 2. Memory circuit 300 also includes a single-port memory interface 310, and a read/write address port 301.

Memory circuit 300 is similar to memory circuit 200, but is configured to receive read/write addresses on a single address port instead of separate read and write addresses on separate address ports. Thus, in memory circuit 300, address port 301 replaces write address port 101 and read address port 105.

Address port 301 is configured to receive a read/write address RW_ADD. Read/write address RW_ADD includes an input address originating at a location external to memory circuit 300 and acts as either a read address or a write address. In some embodiments, memory circuit 300 is configured to respond to read/write address RW_ADD as either a read address or a write address depending on the logical state of a write enable signal (not shown).

Single-port memory interface 310 includes an address port 311 configured to receive read/write address RW_ADD on address port 301 and to provide read/write address RW_ADD to memory 210 in a multi-port configuration. In the embodiment depicted in FIG. 3, memory 210 is a dual-port memory and address port 311 is configured to provide read/write address RW_ADD to memory 210 on two branches of address port 311, represented by two arrows in FIG. 3. In some embodiments, memory 210 is a multi-port memory having more than two ports, and address port 311 is configured to provide read/write address RW_ADD to memory 210 on a number of branches that matches the number of ports of the multi-port memory.

Because memory 210 is either a dual-port memory or a multi-port memory having more than two ports, memory 210 includes two or more address decoder circuits (not shown). As described above with respect to memory circuit 200, the combination of memory 210, encoding circuit 230, decoding circuit 250, and error detecting circuit 160 facilitates the determination of errors on addresses received on separate read and write address ports. By providing read/write address RW_ADD to memory 210 on separate ports, single-port memory interface 310 facilitates the same error detection capability in memory circuit 300.

Memory circuit 300 is thereby configured so that, in a read operation, the existence of an address error is determined from decoded write address D_W_ADD on decode output port 253 and read/write address RW_ADD on address port 301, decoded write address D_W_ADD being based on read/write address RW_ADD on address port 301 and parity bits P_B generated from the read/write address RW_ADD on address port 301 used in a prior write operation.

By having multi-port memory 210 and single-port memory interface 310, in some embodiments, memory circuit 300 facilitates the detection and correction of address errors and avoids address fault aliasing while providing single-port memory functionality to external circuits. Compared to other single-port memory circuits that do not have multi-port memories, memory circuit 300 has improved address error detection at the cost of a larger memory area for the multi-port memory.

Figure 4:
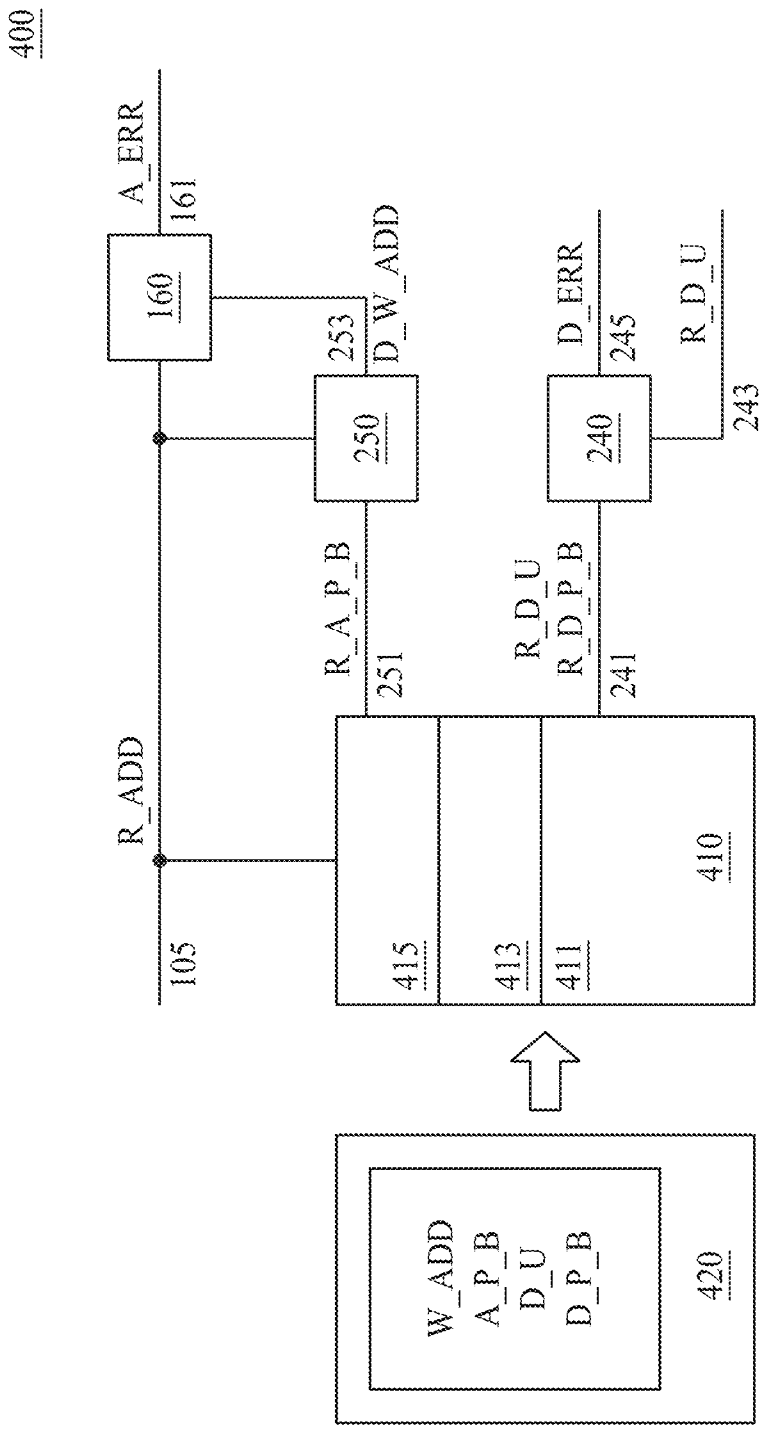
FIG. 4 is a diagram of a memory circuit, in accordance with some embodiments.

FIG. 4 is a diagram of a memory circuit 400, in accordance with some embodiments. Memory circuit 400 includes error detecting circuit 160, decoding circuit 240, decoding circuit 250, and read address port 105, described above with respect to memory circuits 100 and 200 and FIGS. 1 and 2, and a read-only memory (ROM) 410. FIG. 4 also includes a representation of a ROM programmer 420 separate from memory circuit 400.

ROM programmer 420 is a system including a combination of hardware and software configured to generate and program, or write, data bits in a ROM such as ROM 410. In operation, ROM programmer 420 performs an off-line process that includes applying ECC to data unit D_U to generate data parity bits D_P_B and applying ECC to write address W_ADD for data unit D_U to generate address parity bits A_P_B. In operation, the off-line process performed by ROM programmer 420 also includes programming ROM 410 with data unit D_U, data parity bits D_P_B, and address parity bits A_P_B.

As a result of the off-line process performed by ROM programmer 420, ROM 410 is configured to store data, including data unit D_U, in a ROM portion 411, to store parity data, including data parity bits D_P_B, in a ROM portion 413, and to store parity data, including address parity bits A_P_B, in a ROM portion 415. ROM 410 is configured to store data unit D_U, address parity bits A_P_B, and data parity bits D_P_B at one or more locations determined by the write address W_ADD, and to retrieve stored data unit D_U, address parity bits A_P_B, and data parity bits D_P_B from the one or more locations in response to read address R_ADD on read address port 105.

In some embodiments, ROM 410 is configured to store data unit D_U, data parity bits D_P_B, and address parity bits A_P_B as a single word, with data unit D_U stored at a location in ROM portion 411 adjacent to locations at which data parity bits D_P_B are stored in ROM portion 413 and at which address parity bits A_P_B are stored in ROM portion 415. In some embodiments, one or more of data unit D_U, data parity bits D_P_B, or address parity bits A_P_B is stored in ROM 410 at one or more locations separate from one or more locations at which another one or more of data unit D_U, data parity bits D_P_B, or address parity bits A_P_B are stored.

Memory circuit 400 is thereby configured so that, in operation, the existence of an address error is determined from decoded write address D_W_ADD on decode output port 253 and read address R_ADD on read address port 105, decoded write address D_W_ADD being based on read address R_ADD on read address port 105 and parity bits P_B generated from write address W_ADD.

By storing address parity bits and including decoding and error detecting circuits, in some embodiments, memory circuit 400 facilitates the detection and correction of address errors while providing single-port ROM functioning to external circuits. Compared to other ROM circuits that do not have stored address parity bits, in some embodiments, memory circuit 400 has improved address error detection at the cost of a slightly larger ROM area.

Figure 5:
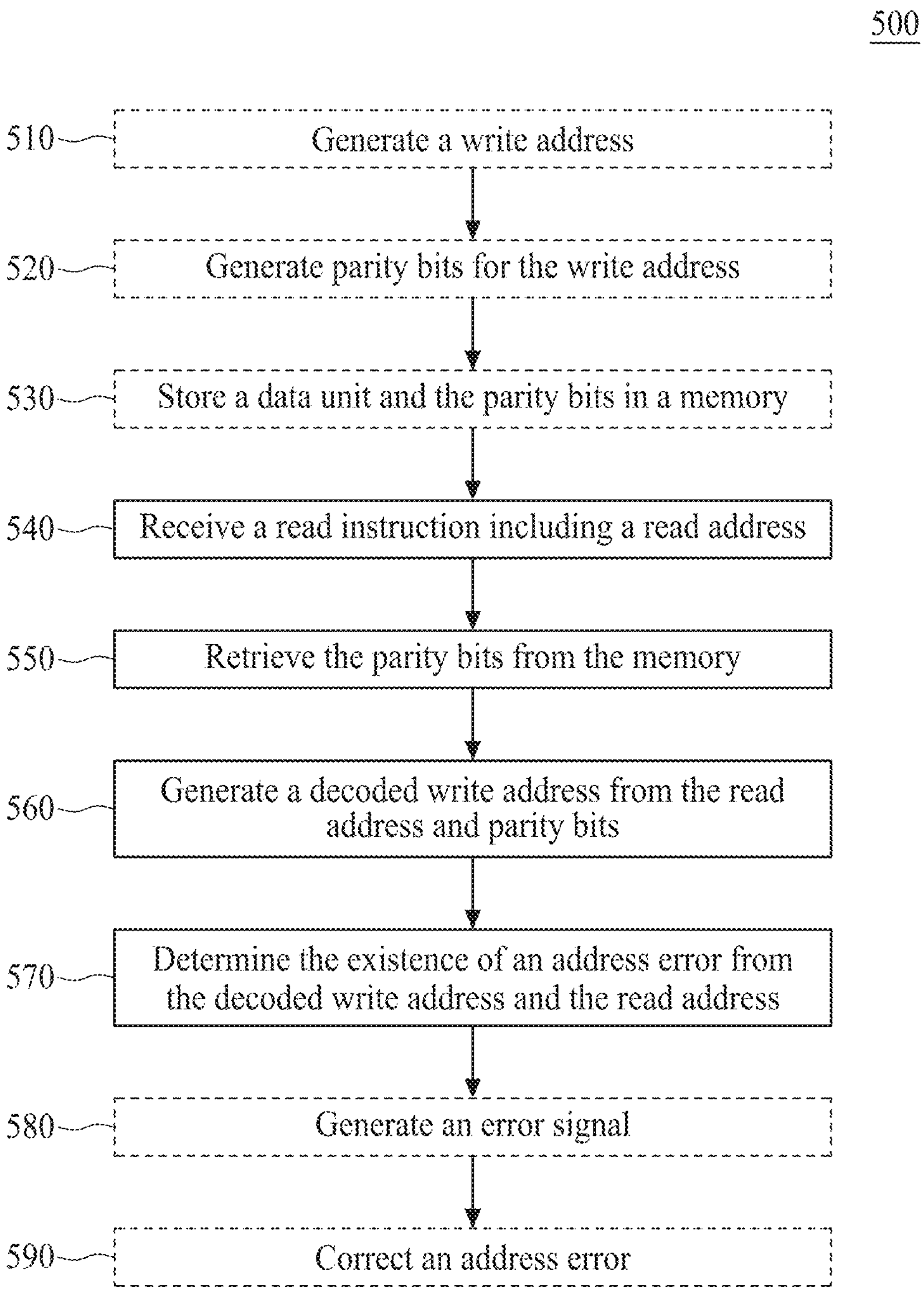
FIG. 5 is a flowchart of a method of protecting a memory circuit, in accordance with some embodiments.

FIG. 5 is a flowchart of a method 500 of protecting a memory circuit, in accordance with one or more embodiments. Method 500 is capable of being performed with each of memory circuits 100, 200, 300, or 400, discussed above.

The sequence in which the operations of method 500 are depicted in FIG. 5 is for illustration only; the operations of method 500 are capable of being executed in sequences that differ from that depicted in FIG. 5. In some embodiments, operations in addition to those depicted in FIG. 5 are performed before, between and/or after the operations depicted in FIG. 5.

At operation 510, a write address is generated. In some embodiments, generating the write address is performed by a circuit in communication with a memory circuit and provided to the memory circuit as part of a write operation. In some embodiments, the write address is write address W_ADD described above with respect to memory circuits 100, 200 and 400. In some embodiments, the write address is read/write address RW_ADD described above with respect to memory circuit 300. In some embodiments, operation 510 is optional.

At operation 520, parity bits are generated for the write address. In some embodiments, generating the parity bits is performed based on the write address combined with a data unit associated with the write address. In some embodiments, generating the parity bits is performed based on the write address only. In some embodiments, generating the parity bits is performed by applying ECC to the write address. In some embodiments, operation 520 is optional.

In some embodiments, generating the parity bits is performed using encoding circuit 130, described above with respect to memory circuit 100. In some embodiments, generating the parity bits is performed using encoding circuit 230, described above with respect to memory circuits 200 and 300. In some embodiments, generating the parity bits is performed as part of ROM programming process 420, described above with respect to memory circuit 400.

At operation 530, a data unit and parity bits are stored in a memory. In some embodiments, storing the data unit and parity bits includes storing the data unit and parity bits at adjacent locations in the memory. In some embodiments, storing the data unit and parity bits includes storing the data unit and parity bits at non-adjacent locations in the memory. In some embodiments, operation 530 is optional.

In some embodiments, storing the data unit and parity bits includes storing data unit D_U and parity bits P_B in memory 110, described above with respect to memory circuit 100. In some embodiments, storing the data unit and parity bits includes storing data unit D_U and address parity bits A_P_B in memory 210, described above with respect to memory circuits 200 and 300. In some embodiments, storing the data unit and parity bits is part of the off-line process performed by ROM programmer 420 for ROM 410, described above with respect to memory circuit 400.

At operation 540, a read instruction is received by a memory circuit. In some embodiments, the read instruction is received as part of a read operation of the memory circuit. In some embodiments, the read instruction is received as part of a test of the memory circuit. The read instruction includes a read address for a data unit stored in a memory of the memory circuit.

In some embodiments, the read instruction includes read address R_ADD received on read address port 105, described above with respect to memory circuits 100, 200, or 400. In some embodiments, the read instruction includes read/write address RW_ADD received on read/write address port 301, described above with respect to memory circuit 300.

At operation 550, parity bits are retrieved from a memory. The parity bits are based on a write address for a data unit stored in the memory. In some embodiments, retrieving the parity bits from the memory includes retrieving retrieved parity bits R_P_B from memory 110 on memory output port 151, described above with respect to memory circuit 100. In some embodiments, retrieving the parity bits from the memory includes retrieving retrieved address parity bits R_A_P_B from memory 210 on memory output port 251, described above with respect to memory circuits 200 and 300. In some embodiments, retrieving the parity bits from the memory includes retrieving retrieved parity bits R_A_P_B from ROM 410 on memory output port 251, described above with respect to memory circuit 400.

In some embodiments, operation 550 includes retrieving the data unit from the memory. In some embodiments, operation 550 includes retrieving retrieved data unit R_D_U from memory 110 on memory output port 151, described above with respect to memory circuit 100. In some embodiments, operation 550 includes retrieving retrieved data unit R_D_U from memory 210 on memory output port 241, described above with respect to memory circuits 200 and 300, or from ROM 410 on memory output port 241, described above with respect to memory circuit 400.

At operation 560, a decoded write address is generated from the read address of the read instruction and the retrieved parity bits. In some embodiments, generating the decoded write address is performed by applying ECC to the parity bits based on the write address combined with a data unit. In some embodiments, generating the decoded write address is performed by applying ECC to read address R_ADD on read address port 105 and retrieved parity bits R_P_B on memory output port 151, described above with respect to memory circuit 100.

In some embodiments, generating the decoded write address is performed by applying ECC to the parity bits based on the write address only. In some embodiments, generating the decoded write address is performed by applying ECC to read address R_ADD on read address port 105 and retrieved address parity bits R_A_P_B on memory output port 251, described above with respect to memory circuits 200 and 400. In some embodiments, generating the decoded write address is performed by applying ECC to read/write address RW_ADD on read/write address port 301 and retrieved address parity bits R_A_P_B on memory output port 251, described above with respect to memory circuit 300.

In some embodiments, decoding the write address is performed using decoding circuit 150, described above with respect to memory circuit 100. In some embodiments, decoding the write address is performed using decoding circuit 250, described above with respect to memory circuits 200, 300, or 400.

In some embodiments, operation 560 includes outputting a data unit on a data output port. In some embodiments, outputting a data unit includes outputting retrieved data unit R_D_U on data output port 153 using decoding circuit 150, described above with respect to memory circuit 100. In some embodiments, outputting a data unit includes outputting retrieved data unit R_D_U on data output port 243 using decoding circuit 250, described above with respect to memory circuits 200, 300, or 400.

In some embodiments, operation 560 includes outputting an error signal on a data error port based on detecting an error within a stored data unit. In some embodiments, outputting an error signal includes outputting error signal D_ERR on data error port 155 using decoding circuit 150, described above with respect to memory circuit 100. In some embodiments, outputting an error signal includes outputting data error signal D_ERR on data error port 245 using decoding circuit 250, described above with respect to memory circuits 200, 300, or 400.

At operation 570, the existence of an address error is determined from the decoded write address and the read address. In some embodiments, determining the existence of an address error includes determining if the decoded write address and the read address are equal. In some embodiments, determining the existence of an address error includes comparing the decoded write address to the read address with a logic circuit. In some embodiments, determining the existence of an address error is performed using error detecting circuit 160, described above with respect to memory circuits 100, 200, 300, or 400.

At operation 580, an error signal is generated based on determining the existence of an address error. In some embodiments, generating the error signal includes generating error signal A_ERR using error detecting circuit 160, described above with respect to memory circuits 100, 200, 300, or 400. In some embodiments, operation 580 is optional.

In some embodiments, operation 580 includes outputting the error signal on an address error port. In some embodiments, outputting the error signal includes outputting error signal A_ERR on address error port 161 using error detecting circuit 160, described above with respect to memory circuits 100, 200, 300, or 400.

At operation 590, an address error is corrected based on determining the existence of an address error. In some embodiments, correcting the address error is performed using one of memory circuits 100, 200, 300, or 400. In some embodiments, correcting the address error is performed using a circuit in communication with one of memory circuits 100, 200, 300, or 400. In some embodiments, operation 590 is optional.

By performing the operations of method 500, the existence of an address error is determined from a decoded write address and a read address, the decoded write address being based on the read address and parity bits generated from the original write address.

By relying on decoded write addresses and received read addresses, method 500 detects address errors without storing write addresses in memory. Method 500 therefore facilitates error detection and correction using a smaller memory size than applications in which write addresses are stored in memory. Method 500 also facilitates dual-port based error detection and correction in single-port memory or ROM applications.

In some embodiments, a memory circuit includes: a memory configured to store a data unit and a corresponding first code; a decoding circuit configured to do as follows including, generate a second code based on a read address associated with the stored data unit, and generate a decoded write address based on the second code; a first error detecting circuit configured to do as follows including, determine an address fault by performing a first comparison between the read address and the decoded write address, and generate an error signal indicative of a result of the first comparison.

In some embodiments, the first code is a set of information based on a write address associated with the stored data unit; and the memory is further configured to be free of storing the write address.

In some embodiments, the set of information is comprised of parity bits.

In some embodiments, the set of information is based only on the write address associated with the stored data unit.

In some embodiments, the second code is comprised of regenerated parity bits.

In some embodiments, the memory circuit further includes: a second error decoding circuit configured to do as follows including: retrieve the stored data unit based on a read address associated with the stored data unit; generate a third code based on the stored data unit; determine a data fault by performing a second comparison between the third code and the first code; and generate an error signal indicative of a result of the second comparison.

In some embodiments, the third code is a set of parity bits or an error correction code (ECC).

In some embodiments, the second error decoding circuit is further configured to output the stored data unit.

In some embodiments, a memory circuit includes: an encoding circuit configured to generate a first code based on a data unit and a second code based on a write address associated with a stored data unit; a memory configured to store the data unit and the first and second codes; a decoding circuit configured to do as follows including, output the stored data unit based on a read address associated with the stored data unit, generate a data unit error signal based on the stored data unit and the first code, the data unit error signal being indicative of an error in the stored data unit, and generate a decoded write address based on the read address and a third code; and an error detecting circuit configured to do as follows including, determine an address fault by performing a comparison between the read address and the decoded write address, and generate an address error signal indicative of a result of comparison.

In some embodiments, the memory is further configured to be free of storing the write address.

In some embodiments, the first code is a set of parity bits.

In some embodiments, the first code is based only on the write address associated with the stored data unit.

In some embodiments, the third code is comprised of regenerated parity bits.

In some embodiments, the third code is a set of parity bits or an error correction code (ECC).

In some embodiments, the error detecting circuit is further configured to output the stored data unit.

In some embodiments, a method (of operation a memory circuit) includes: receiving a read address associated with a data unit stored in the memory circuit; receiving a first code associated with the stored data unit; generating a second code based on the read address; generating a decoded write address based on the second code; determining an address fault by performing a comparison between the read address and the decoded write address and the read address; and generating an error signal indicative of a result of comparison.

In some embodiments, the first code is a set of information based on a write address associated with the stored data unit; and the method further includes avoiding storing the write address in the memory circuit such that the memory circuit is free of storing the write address.

In some embodiments, the set of information is comprised of parity bits.

In some embodiments, the method further includes generating the first code based only on a write address associated with the stored data unit.

In some embodiments, the generating a second code includes generating parity bits based on the read address; the parity bits comprising the second code.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A memory circuit comprising:

a memory configured to store a data unit and a corresponding first code;

a decoding circuit configured to do as follows including, generate a second code based on a read address associated with the stored data unit, and generate a decoded write address based on the second code;

a first error detecting circuit configured to do as follows including, determine an address fault by performing a first comparison between the read address and the decoded write address, and generate an error signal indicative of a result of the first comparison.

2. The memory circuit of claim 1, wherein:

the first code is a set of information based on a write address associated with the stored data unit; and the memory is further configured to be free of storing the write address.

3. The memory circuit of claim 2, wherein:

the set of information is comprised of parity bits.

4. The memory circuit of claim 2, wherein:

the set of information is based only on the write address associated with the stored data unit.

5. The memory circuit of claim 1, wherein:

the second code is comprised of regenerated parity bits.

6. The memory circuit of claim 1, further comprising:

a second error decoding circuit configured to do as follows including:

retrieve the stored data unit based on a read address associated with the stored data unit;

generate a third code based on the stored data unit;

determine a data fault by performing a second comparison between the third code and the first code; and generate an error signal indicative of a result of the second comparison.

7. The memory circuit of claim 6, wherein:

the third code is a set of parity bits or an error correction code (ECC).

8. The memory circuit of claim 6, wherein:

the second error decoding circuit is further configured to output the stored data unit.

9. A memory circuit comprising:

an encoding circuit configured to generate a first code based on a data unit and a second code based on a write address associated with a stored data unit;

a memory configured to store the data unit and the first and second codes;

a decoding circuit configured to do as follows including, output the stored data unit based on a read address associated with the stored data unit, generate a data unit error signal based on the stored data unit and the first code, the data unit error signal being indicative of an error in the stored data unit, and generate a decoded write address based on the read address and a third code; and an error detecting circuit configured to do as follows including, determine an address fault by performing a comparison between the read address and the decoded write address, and generate an address error signal indicative of a result of comparison.

10. The memory circuit of claim 9, wherein:

the memory is further configured to be free of storing the write address.

11. The memory circuit of claim 9, wherein:

the first code is a set of parity bits.

12. The memory circuit of claim 9, wherein:

the first code is based only on the write address associated with the stored data unit.

13. The memory circuit of claim 9, wherein:

the third code is comprised of regenerated parity bits.

14. The memory circuit of claim 9, wherein:

the third code is a set of parity bits or an error correction code (ECC).

15. The memory circuit of claim 9, wherein:

the error detecting circuit is further configured to output the stored data unit.

16. A method of operating a memory circuit, the method comprising:

receiving a read address associated with a data unit stored in the memory circuit;

receiving a first code associated with the stored data unit;

generating a second code based on the read address;

generating a decoded write address based on the second code;

determining an address fault by performing a comparison between the read address and the decoded write address and the read address; and generating an error signal indicative of a result of comparison.

17. The method of claim 16, wherein:

the first code is a set of information based on a write address associated with the stored data unit; and the method further comprises:

avoiding storing the write address in the memory circuit such that the memory circuit is free of storing the write address.

18. The method of claim 17, wherein:

the set of information is comprised of parity bits.

19. The method of claim 16, further comprising:

generating the first code based only on a write address associated with the stored data unit.

20. The method of claim 16, wherein the generating a second code includes:

generating parity bits based on the read address; the parity bits comprising the second code.

* * * * *